(12) United States Patent
Bond et al.

(10) Patent No.: US 8,752,745 B2
(45) Date of Patent: Jun. 17, 2014

(54) ENCLOSED WEATHERPROOF FIREARM CASE

(76) Inventors: Charles Bond, Phoenix, AZ (US);
David T. Delaney, Phoenix, AZ (US)

( * ) Notice: Subject to any disclaimer, the term of this patent is extended or adjusted under 35 U.S.C. 154(b) by 398 days.

(21) Appl. No.: 13/104,385

(22) Filed: May 10, 2011

(65) Prior Publication Data
US 2011/0272445 A1  Nov. 10, 2011

Related U.S. Application Data

(60) Provisional application No. 61/395,148, filed on May 10, 2010.

(51) Int. Cl.
*B60R 7/00* (2006.01)
*B62J 7/00* (2006.01)
*B65D 85/00* (2006.01)

(52) U.S. Cl.
USPC ........... 224/413; 224/401; 224/435; 224/912; 206/317

(58) Field of Classification Search
USPC ......... 224/413, 400, 545, 433, 434, 435, 527, 224/328, 912, 913, 401; 29/428; 42/70.11; 206/317
See application file for complete search history.

(56) References Cited

U.S. PATENT DOCUMENTS

| | | | |
|---|---|---|---|
| 4,915,273 A | 4/1990 | Allen | |
| 5,172,575 A * | 12/1992 | Fisher | 70/63 |
| 5,236,086 A * | 8/1993 | MacTaggart | 206/317 |
| 5,678,686 A * | 10/1997 | Hagemann et al. | 206/315.11 |
| 5,683,021 A * | 11/1997 | Setina | 224/311 |
| 6,009,996 A * | 1/2000 | Purdy | 206/317 |
| 6,382,484 B1 | 5/2002 | Savant | |
| 6,405,861 B1 * | 6/2002 | Siler et al. | 206/317 |
| 6,570,501 B2 * | 5/2003 | Bushnell et al. | 340/542 |
| 6,634,530 B1 | 10/2003 | Black | |
| 6,729,516 B2 | 5/2004 | Hanagan | |
| 6,829,917 B2 * | 12/2004 | Russell | 70/162 |
| 6,843,081 B1 * | 1/2005 | Painter | 70/63 |
| 6,845,640 B2 * | 1/2005 | Loeff et al. | 70/63 |
| 6,874,628 B2 * | 4/2005 | Hammill | 206/317 |
| 7,025,203 B2 * | 4/2006 | Schonenbach | 206/317 |
| 7,143,913 B2 | 12/2006 | Lindsey et al. | |
| 7,252,171 B2 | 8/2007 | Augustine, Jr. | |
| 7,325,681 B2 * | 2/2008 | Schonenbach | 206/317 |
| 7,434,427 B1 * | 10/2008 | Miresmaili | 70/63 |
| 7,478,724 B2 * | 1/2009 | Vor Keller | 206/317 |

(Continued)

OTHER PUBLICATIONS

S and S Sales Company, Road Warrior-Locking Gun Holster for Motorcycles, http://www.phoenixbikers.com/lockingcyclehoster.html, Jan. 25, 2010, 1 page.

(Continued)

*Primary Examiner* — Justin Larson
*Assistant Examiner* — Lester L Vanterpool
(74) *Attorney, Agent, or Firm* — Reising Ethington P.C.

(57) ABSTRACT

A firearm case which is attachable to a motorcycle comprises a frame the holds and encloses a firearm. The frame includes a firearm lock and latch that securely locks the firearm in place. A housing surrounds the frame as to enclose the frame and firearm, safe from the weather, theft and minor damage. An optional remotely operated control system unlocks the firearm case and the firearm lock simultaneously for quick and easy access to the firearm.

20 Claims, 9 Drawing Sheets

(56) References Cited

U.S. PATENT DOCUMENTS

| | | |
|---|---|---|
| 7,546,920 B1 * | 6/2009 | Horn et al. ............... 206/317 |
| 7,800,822 B2 * | 9/2010 | Whitehead et al. ........ 359/443 |
| 7,980,436 B2 * | 7/2011 | Rodden et al. ............ 224/310 |
| 8,104,313 B2 * | 1/2012 | Wolfe ........................ 70/63 |
| 2003/0159954 A1 * | 8/2003 | Russell ..................... 206/317 |
| 2006/0065560 A1 * | 3/2006 | Dickinson et al. ......... 206/317 |
| 2011/0290837 A1 * | 12/2011 | Smith ....................... 224/413 |
| 2012/0000949 A1 * | 1/2012 | Williams, Jr. ............. 224/401 |

OTHER PUBLICATIONS

Harley-Davidson 2010 Genuine Parts and Accessories Catalogue, p. 351, Fairing Lower Locking Glove Box Doors Set, 1 page.

* cited by examiner

ENCLOSED WEATHERPROOF FIREARM CASE

CROSS-REFERENCE TO RELATED APPLICATIONS

This application claims the benefit of U.S. Provisional Application Ser. No. 61/395,148, filed May 10, 2010. The content of this application is incorporated herein by reference in its entirety.

TECHNICAL FIELD

This invention relates generally to a firearm case for a motorcycle or an all terrain vehicle (ATV) particularly to securely lock the firearm and enclose the firearm from harsh weather conditions.

BACKGROUND OF THE INVENTION

It is known to provide a protective firearm housing for mounting to an ATV and the like, such as disclosed in U.S. Pat. No. 6,634,530 issued to Black on Oct. 21, 2003. The Black mounted firearm case comprises a protective gun housing with an opening on the top through which a firearm may pass. The firearm case comprises three portions: a protective firearm housing, a soft firearm case and a mounting assembly. The protective firearm housing is connected to a mounting assembly designed to attach to handle bars. The firearm housing is designed to outline the shape of a hunting rifle and the soft case, used to protect the firearm, is inserted into the firearm housing. The mounting assembly comprises brackets to hold the firearm housing and mounting collars for attachment to the handlebar. An alternative embodiment further comprises an opening in the firearm housing that is closed by a hinged cover.

One disadvantage of this type of firearm case is that it does not provide a locking feature to keep the firearm safe from theft. Furthermore, although the protective housing of the invention provides a shell to keep the firearm safe from nicks or being banged by foreign objects and from mud, dirt and water being splashed while driving an ATV, this shell does not provide for a protective cage during crashes.

It is also known to provide a permanently mounted gun safe that has a hinged cover and lock to a motorcycle as in U.S. Pat. No. 7,143,913 issued to Lindsey et al Dec. 5, 2006. The Lindsey gun safe is sized and shaped to conform to a conventional handgun. The gun safe is bolted through the back wall of an inner surface to a flat area on a motorcycle, so that it cannot be removed without unlocking the gun safe. Although this firearm case does keep the firearm secure from theft and weather elements, it is not easily accessible if the firearm is needed quickly.

It is also known to mount a firearm to an ATV longitudinally or laterally as disclosed in U.S. Pat. No. 6,382,484 issued to Savant May 7, 2002 and U.S. Pat. No. 4,915,273 issued to Allen Apr. 10, 1990 respectively. The Savant firearm rack discloses a firearm mounting bracket that is attached to a cargo rack assembly of an ATV. A rigid firearm boot is removably received into a loop shaped mounting bracket by a latch assembly that cooperates with a retaining loop of the firearm boot. Although the Savant firearm rack discloses a protective cover and lock for a firearm it is lacking because it only discloses how to mount the removable firearm boot in a longitudinal direction only on an ATV, and is not applicable for a motorcycle.

The Allen firearm rack discloses an assembly for mounting a firearm to an ATV comprising a butt end bracket and a forearm bracket that are attached to a rectangular tube. The tube may be attached to the rear frame of an ATV so that the firearm is in a lateral orientation. Although the Allen firearm rack allows for the lateral mounting of the firearm to an ATV or a motorcycle, the disadvantages of the Allen firearm rack is that it does not provide a cover to keep the firearm safe from inclement weather or in crashes and it does not provide a locking system to keep the firearm secure from theft.

In addition, it is known to provide a locked storage compartment on a motorcycle as disclosed in U.S. Pat. No. 7,252,171 issued to Augustine, Jr. Aug. 7, 2007. The storage compartment discloses a compartment with a lock mounted on the rear fender of a motor cycle so that the access door faces forward. Some disadvantages of this storage compartment are that it is not large enough to contain all varieties of firearms and it does not provide a quick unlock feature to access the contents quickly. U.S. Pat. No. 6,729,516 issued to Hanagan, May 4, 2004, discloses a quick change storage compartment for mounting on a rear fender of a motorcycle.

Holsters have been designed to attach to the side of a motorcycle. The open frame allows a handgun to be attached to the side of the motorcycle. These holsters have a lock for safe keeping. Also closed storage boxes that are attached to a motorcycle have a lock to secure items within the box.

What is needed is a firearm case that s secures and store a firearm to a motorcycle or ATV which keeps the firearm safe from dangers such as theft, crashes and inclement weather, yet allows the firearm to be accessed easily and quickly.

SUMMARY OF THE INVENTION

In accordance with one aspect of the invention, the firearm case has a frame that includes many pieces to form a cage that has a base portion and a top portion. The base portion of the cage is configured to hold the firearm in place. The top portion of the frame is hingedly attached to the base portion of the cage so it opens and closes. The top portion covers over the top of the firearm when the cage is closed as to provide a secure cage around the firearm. The base portion of the cage includes a firearm barrel alignment at an end of the base portion of the cage for supporting a barrel end of the firearm, and a firearm stabilizer at an opposite end of the base portion of the cage for supporting a butt end of the firearm.

The firearm case preferably includes a housing that encloses the frame to provide a protective cover which keeps the firearm safe from inclement weather, road debris and the like.

The firearm case also preferably includes a lockable latch to prevent unauthorized opening of the firearm case.

The firearm case may also include an optional firearm lock that is positioned in the base portion of the frame intermediate the firearm barrel alignment and the firearm stabilizer to lock the firearm in place.

Furthermore, for added security, an optional control system can be built into the frame unlocking the firearm case and the firearm lock from a remote control source. The control system may be designed to unlock the firearm case and the firearm lock simultaneously and also may be designed to relock the firearm case and the firearm lock after a predetermined length of time.

In accordance with another aspect of the invention, a firearm case is constructed for attachment to an exterior of a motor vehicle. The firearm case has an internal clam shell cage member with an upper cage section pivotably connected to a lower frame section for moving between an open and closed position. The cage member has a first locking device for lockably latching the upper cage section to the lower cage section. A firearm clamp has an upper clamp section hingedly attached to a lower clamp section with the lower clamp section mounted in the lower cage section; and the upper clamp section movable between an open position and a clamped locked position encasing a barrel of a firearm disposed in the cage. The firearm clamp having a second locking device for locking the firearm clamp when in the closed position.

Other objects, advantages and application of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views and wherein.

DESCRIPTION OF THE PREFERRED EMBODIMENT

Figure 1:
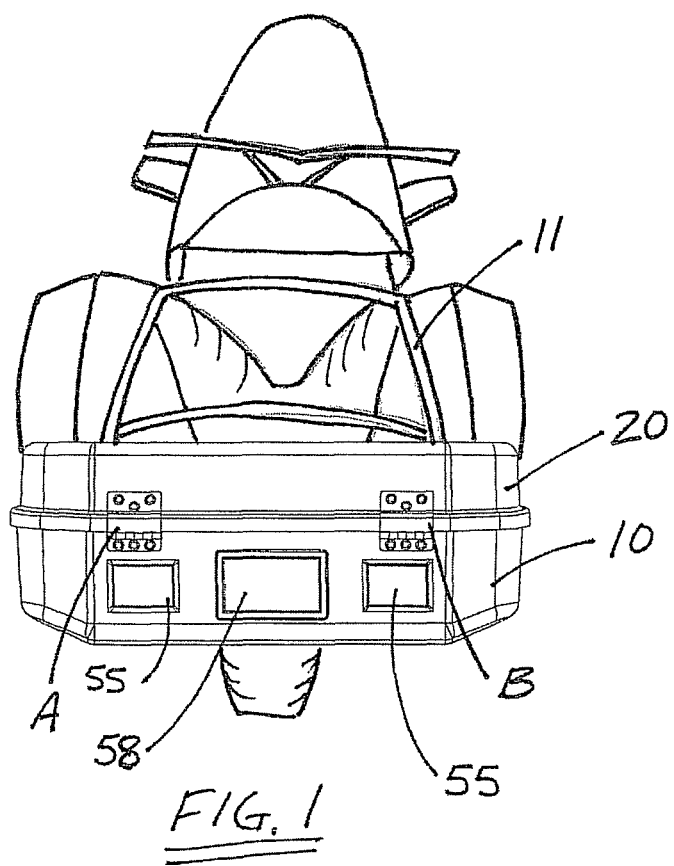
FIG. 1 is a perspective of a motorcycle having a firearm case of the invention attached to a rear crash bar of the motorcycle.

Referring first to FIG. 1, a firearm case 10 of the invention is shown attached to a rear crash bar of a motorcycle 11. The firearm case 10 may be also attached to an ATV or other vehicle or may be attached to any other convenient location on any of the vehicles.

Figure 3:
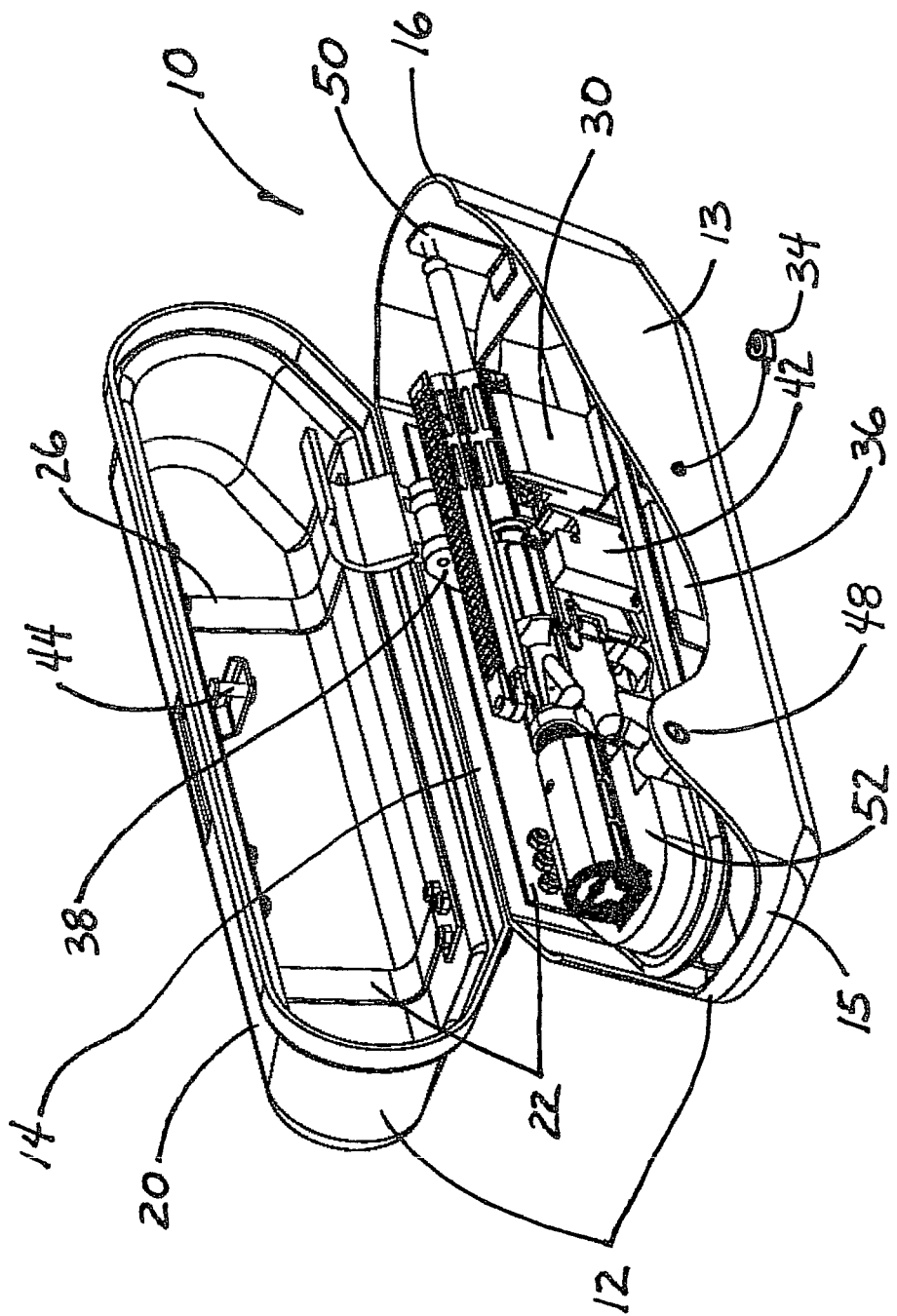
FIG. 3 is a perspective view of the firearm case of FIG. 1 showing the hinged top portion and the firearm lock in the open position with a firearm in place in a base portion of the firearm case.
Figure 4:
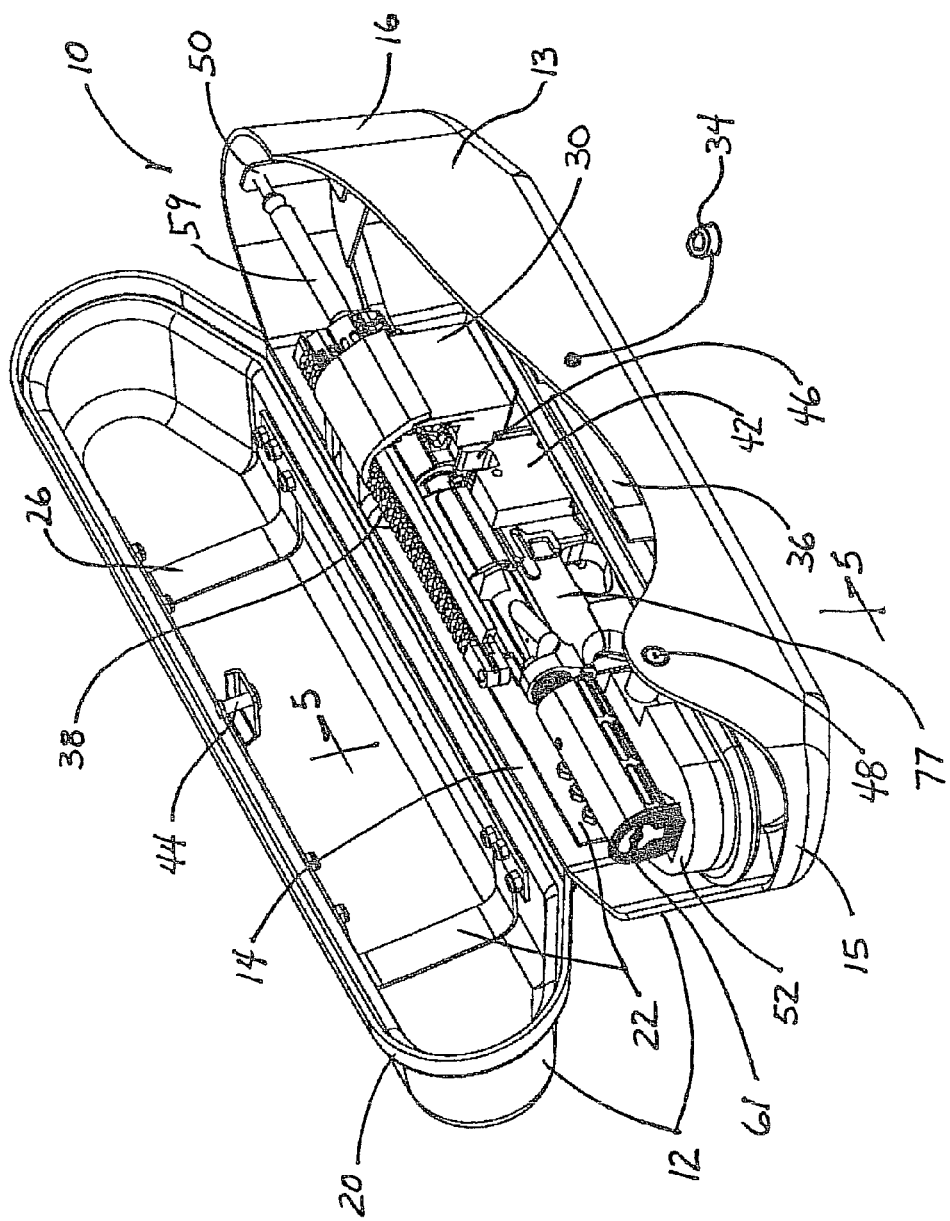
FIG. 4 is a perspective view of the firearm case of FIG. 1 showing the hinged top portion in the open position and the firearm lock in a closed position locking the firearm in place in the base portion of the firearm case.
Figure 5:
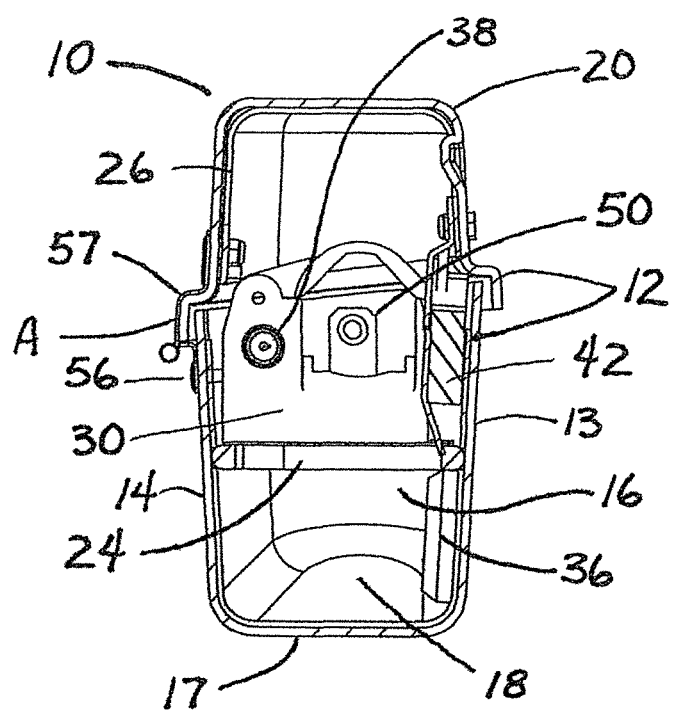
FIG. 5 is a cross section view of the firearm case taken substantially along the line 5-5 of FIG. 4 looking in the direction of the arrows, with the hinged top portion in the closed position, and with the firearm removed to show internal details.

Referring now to FIGS. 2, 3, 4 and 5, the firearm case 10 includes a frame 22 and a housing 12 attached to the frame 22. The frame 22 has many member pieces that make up a base portion 24 and a hinged top portion 26 as explained below. The housing 12 comprises a front wall 13, a rear wall 14, a first side wall 15, a second side wall 16, a bottom wall 17 combining to create a lower housing portion, and a top lid 20 defining a cavity 18 therebetween when the top lid 20 is closed as shown in FIG. 5. The cavity 18 is dimensioned and configured to receive and enclose the frame 22 as shown in FIG. 5. Internal components of the firearm case 10 include a firearm lock 30, a time delay module 36, a latch 42, a firearm barrel alignment 50, and a firearm stabilizer 52. The housing 12 is preferably constructed of a rigid, durable material strong enough to prevent a forced entry into the firearm case 10.

Figure 2:
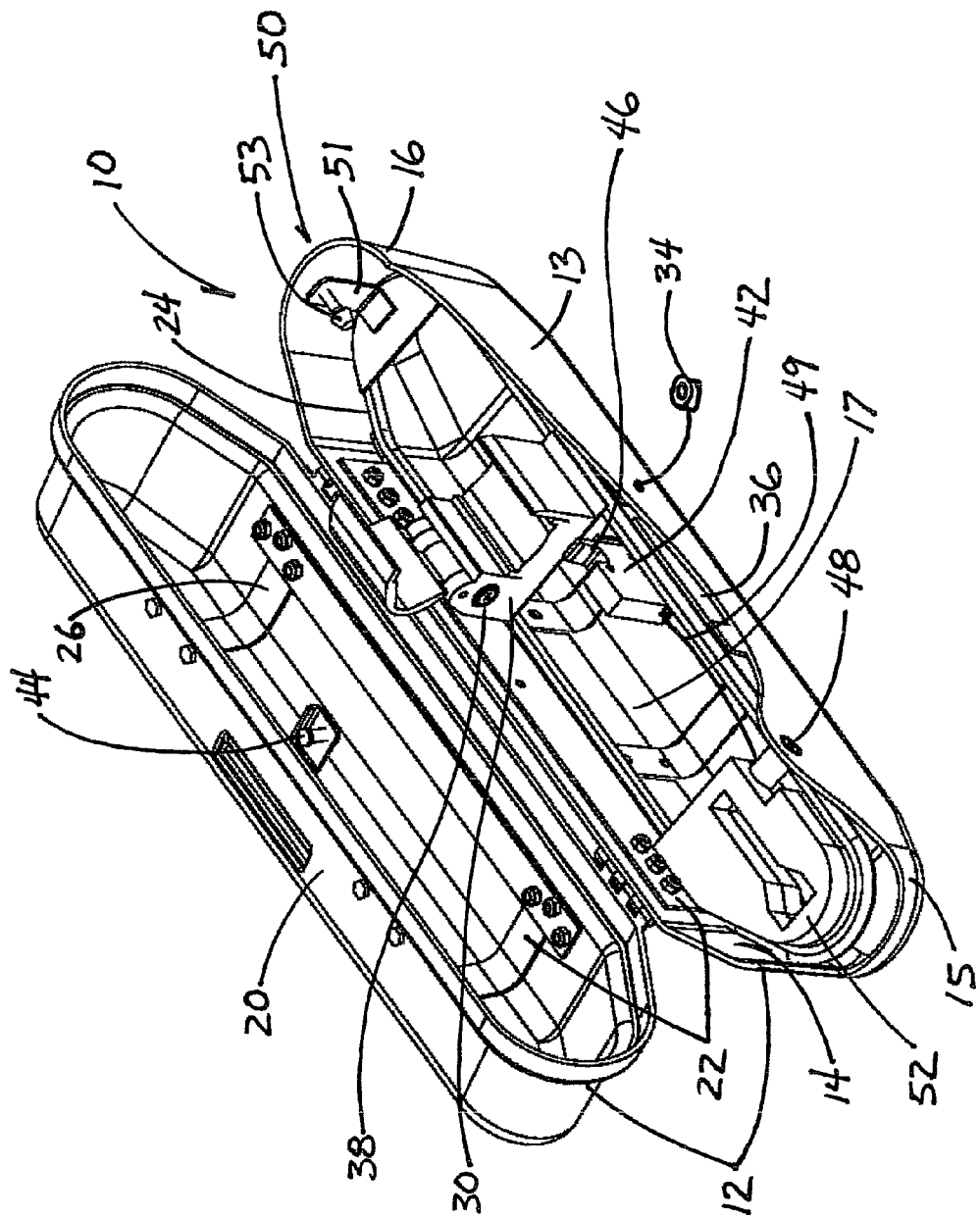
FIG. 2 is a perspective view of the firearm case of FIG. 1 showing a hinged top portion and a firearm lock in an open position to illustrate internal details.

FIGS. 2, 3, and 4 show the internal components and the firearm lock 30 in an open position, a firearm placed in the firearm case with the firearm lock in the open position, and the firearm placed in the firearm case with the firearm lock in a closed position respectively. A suitable firearm lock 30 is a commercially available electronic gun lock made by Pro-Gard and designated as Model No. U5000UT. The firearm lock 30 has a lower clasp member 31 mounted on base portion 24 of frame 22 with an upper clasp member 32 hingedly connected to the lower clasping member 31. The firearm lock 30 can be opened remotely by an electric signal and also has a mechanical override in which a key can be placed into a mechanical firearm lock 38 to unlock it manually. Other suitable firearm locks may be used. However, it is preferable any alternate firearm lock be capable of being opened remotely by an electric signal and include a key operated mechanical override.

FIG. 5 shows a cross section of the invention and discloses how the frame 22 and housing 12 are attached to each other by two external hinges A and B. Each external hinge comprises a lower hinge plate 56 and an upper hinge plate 57. The two external hinges are located on the outside of the housing 12. The top lid 20 of the housing 12 is attached to the hinged top portion 26 of the frame 22 by a plurality of fasteners that go through the upper hinge plate 57, through the top lid 20 and through the hinged top portion 26 of the frame 22. The lower portion of the housing 12 is attached to the base portion 24 of the frame 22 by a plurality of fasteners that go through the lower hinge plate 56, through the rear wall 12 and the base portion 24 of the frame 22. While the drawings show nuts and bolts, any suitable fasteners may be used.

The two external hinges A and B connect the base portion 24 of the frame 22 to the hinged top portion 26 of the frame 22 so that the frame 22 can be opened and closed while the hinged top portion 26 stays intact. The top lid 20 moves in conjunction with the hinged top portion 26 of the frame 22 while opening and closing.

Figure 6:
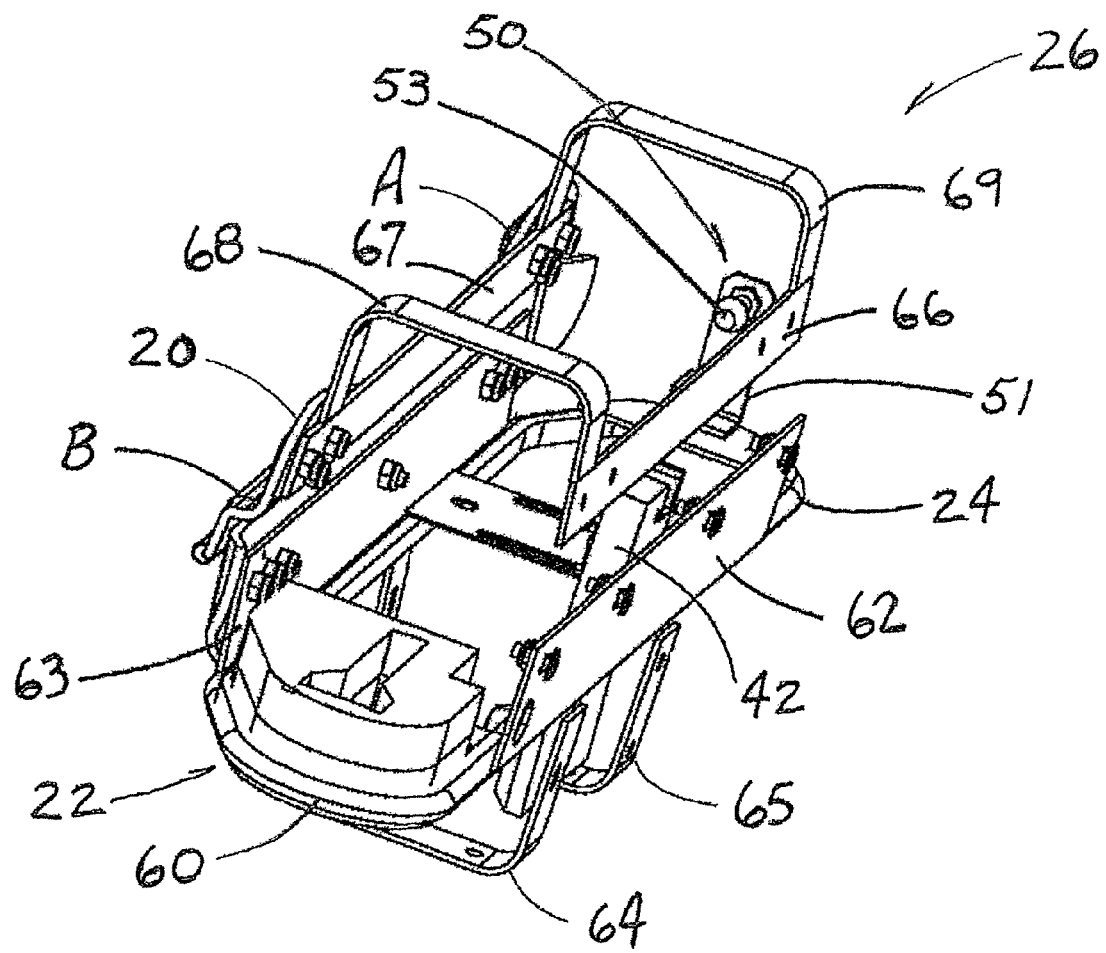
FIG. 6 is a perspective view of the firearm case with the housing cut away to show details of an internal frame of the firearm case.

FIG. 6 shows a perspective of the frame 22. The base portion 24 of the frame 22 comprises of an oblong rectangular rod 60 that provides a perimeter for the firearm stored in the firearm case 10. A front plate 62 and a rear plate 63, both plates being long, narrow and rectangular, attach to the oblong rectangular rod 60 longitudinally. The front plate 62 and the rear plate 63 extend up from the oblong rectangular rod 60 and face each other. A first lower band 64 and a second lower band 65, both bands being U-shaped, each reach perpendicularly from a long side of the oblong rectangular rod 60 to a second long side of the oblong rectangular rod 60, such that the first lower band 64 and the second lower band 65 create a bottom cradle of the frame 22. The firearm barrel alignment 50 is attached at a narrow end of the oblong rectangular rod 60 for supporting a barrel end of the firearm. The firearm barrel alignment 50 is comprised of an L-shaped brace 51 and a rod that protrudes inwardly and carries a tapered plug 53 that fits into the barrel end 59 of the firearm 77 to hold it in place. The firearm stabilizer 52 is attached at an opposite narrow end of the oblong rectangular rod 60 and sits within the first lower band 64 for supporting a butt end 61 of the firearm 57. The firearm stabilizer 52 is a block with a slot in the top of the block for receiving the butt end 61 of the firearm. The base portion 24 of the frame 22 also includes a mounting plate 70 for the firearm lock 30 that is attached to the oblong rectangular rod 60.

The hinged top portion 26 of the frame 22 has a front upper plate 66 and a rear upper plate 67, both plates being long, narrow and rectangular. The front upper plate 66 and the rear upper plate 67 run parallel to each other and run longitudinally in the hinged top portion 26 of the frame 22. A first upper band 68 and a second upper band 69, both bands being U-shaped, each reach perpendicularly from the front upper plate 66 to the rear upper plate 67 to connect the two plates as shown in FIG. 6.

Figure 7:
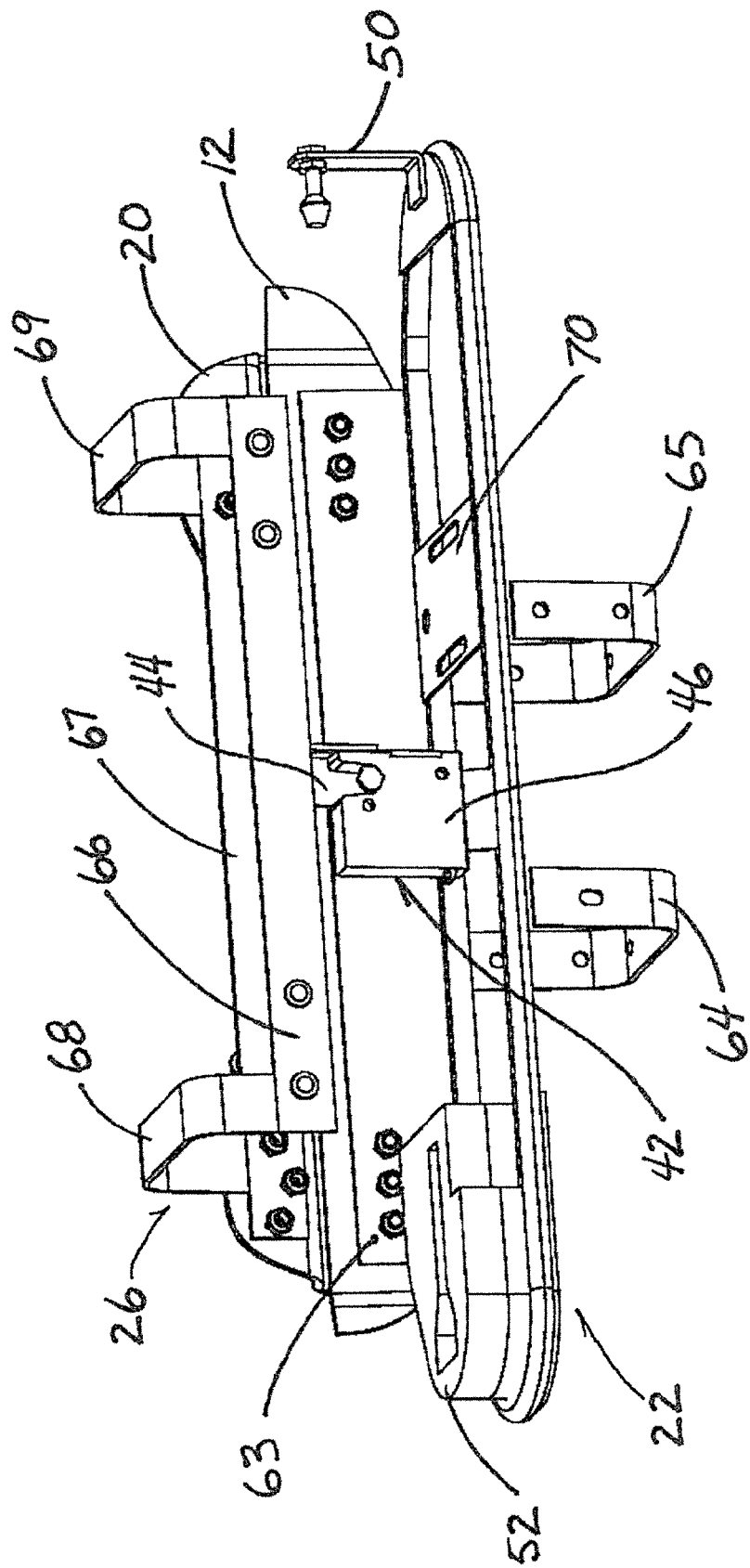
FIG. 7 is a perspective view of the firearm case with the housing cut away and showing the internal frame of the firearm case with a portion of the internal frame removed to illustrate internal components.

The rear plate 63 and the rear upper plate 67 serve as backing plates for the hinges A and B as shown in FIGS. 5, 6, and 7. In the preferred embodiment of the present invention the structural components that make up the frame 22 are preferably constructed of strong durable material, for example, stainless steel that is strong enough to survive forced entry and severe hits. Non-structural components such as the stabilizer may be made of a convenient material, for example a molded foam.

FIG. 7 shows a perspective of the frame 22 with the front plate 62 removed to show the latch 42. The latch 42 comprises a latch arm 44 and a catch member 46. The latch arm is connected to the hinged top portion 26 of the frame 22 at the upper front plate 66, intermediate to the firearm band. alignment 50 and the firearm stabilizer 52. The catch member 46 is connected to the base portion 24 of the frame 22 adjacent to the position of the latch arm 44. A suitable latch 42 is a commercially available electric rotary latch made by SouthCo and designated as Model No. R4-EM-11-131. The latch 42 can be remotely unlocked through an electric signal and also has a mechanical override capability. A mechanical frame lock 48 is attached to the base portion 24 of the frame 22 and protrudes through the housing 12, such that a key can be placed into the mechanical frame lock 48 as shown in FIGS. 2, 3, and 4. The mechanical frame lock 48 is connected to the latch 42 by a cable 49, such that when a key is inserted into the mechanical frame lock 48 and the key is turned, the cable 49 pulls an internal catch (not shown) and overrides the latch 42 to open it, releasing the latch arm 44. Other suitable latches may be used. However it is preferable any alternate latch be capable of being opened remotely by an electric signal and include a key operated mechanical override.

Figure 8:
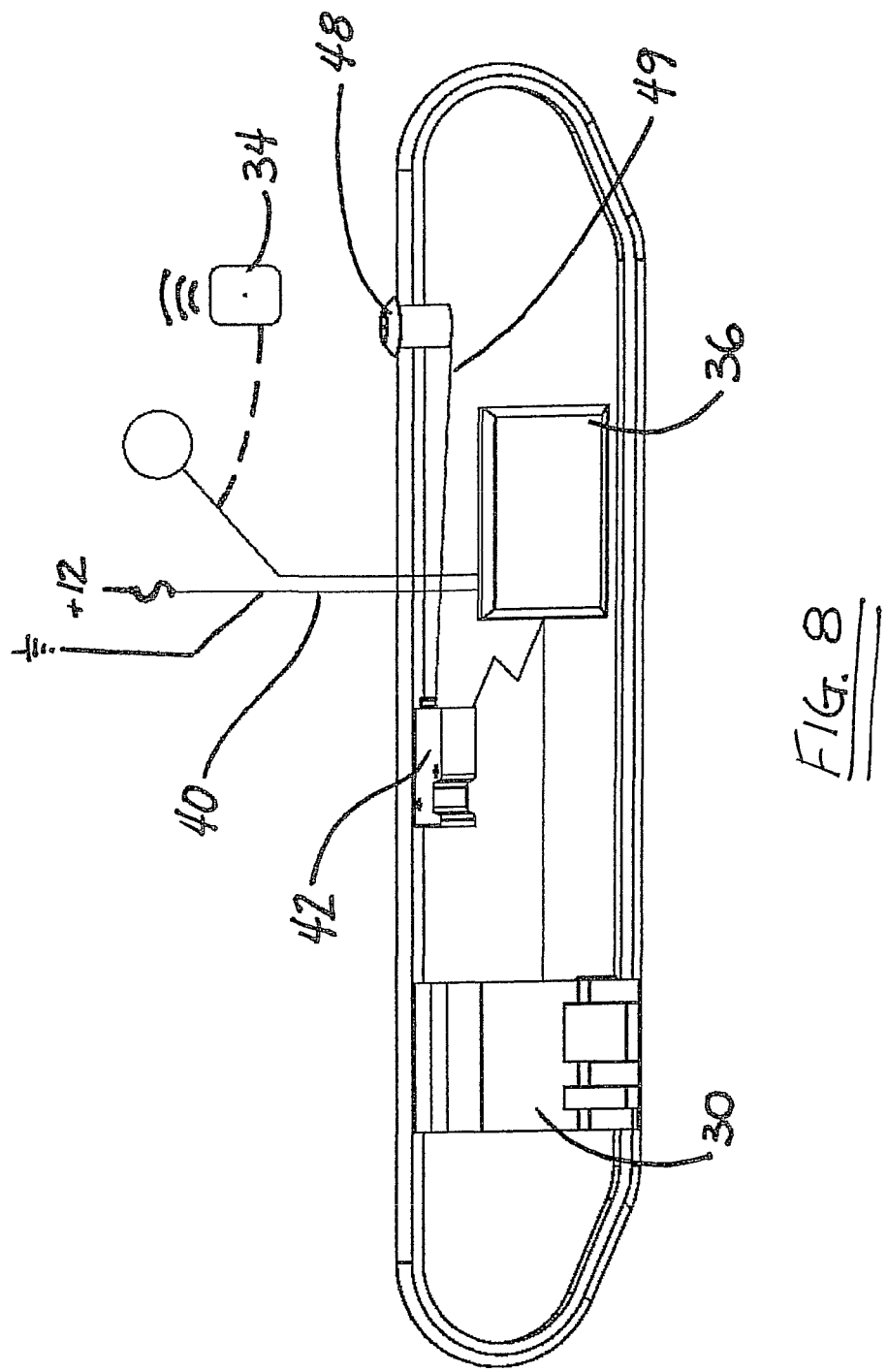
FIG. 8 is a schematic diagram of a control system for the firearm case.

FIG. 8 is a schematic diagram of an electronic control system for unlocking the firearm case 10 remotely. A remote unlock switch 34, which can be a button is either wired to the motorcycle or can be a wireless device such as a remote unlock button on a key chain for an automobile. The remote unlock switch 34 sends a signal to a time delay module 36 that is mounted on the frame 22. The time delay module 36 then relays the signal to both the firearm lock 30 and the latch 42 simultaneously causing both to unlock. The signal holds the firearm lock 30 and the latch 42 in the unlocked position for a predetermined length of time set by the time delay module 36. If the firearm case 10 is not opened within the predetermined length of time the firearm lock 30 and latch 42 both return to a locked state. As an additional safeguard, the control system may require the motorcycle's ignition to be turned to an auxiliary position before the remote unlock switch 34 can operate. The latch 42, the time delay module 36 and the firearm lock 30 are powered by a power supply 40 affixed to the motorcycle 11.

The firearm case 10 is preferably attached to the rear of the motorcycle in any suitable manner so that front of the firearm case 10 faces forward as shown in FIG. 1. This precautionary measure is a further protection against an unauthorized forced opening of the firearm case 10.

Figure 9:
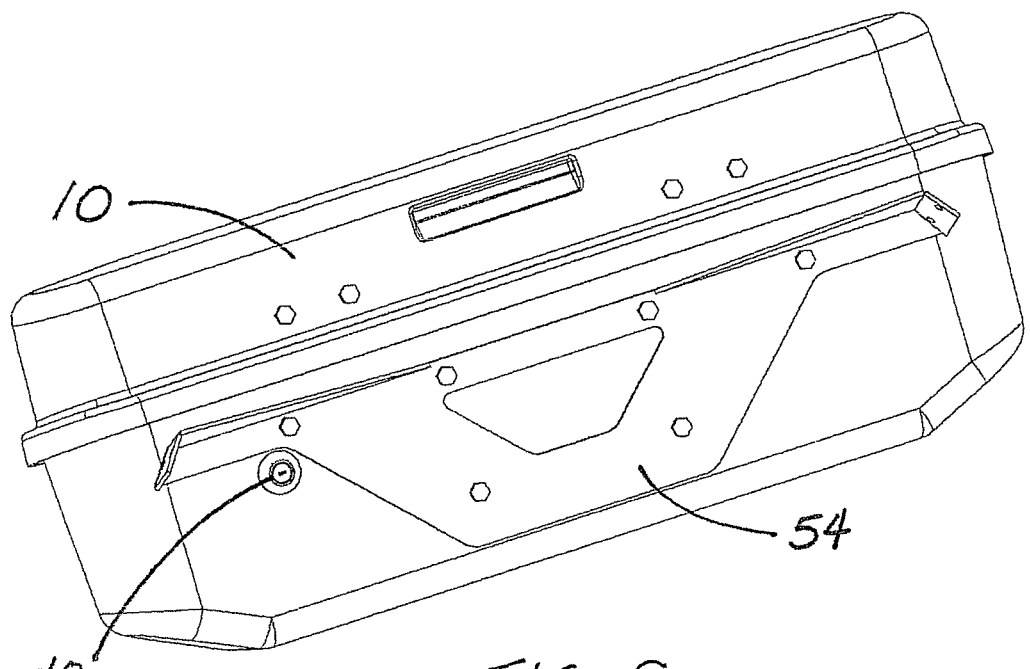
FIG. 9 is a front elevational view of an additional embodiment of a firearm case having a plurality of components affixed to the rear wall of firearm case housing

FIG. 9 shows a typical mounting assembly 54 comprising a series of brackets that are attached to the firearm case 10 for mounting it to the motorcycle 11. When the firearm case 10 is installed, it may become the new holding place for the motorcycle's license plate 58 and LED storable lights 55 as shown in FIG. 1.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under law.

We claim:

1. A firearm case constructed for attachment to a motorcycle or an ATV, said firearm case comprising:
   a frame comprising a plurality of pieces that form a cage, the cage comprising a base portion and a hinged top portion, the base portion being configured to hold a firearm, the hinged top portion being configured to cover the top of the firearm and close the cage, when the hinged top portion is moved to a closed position;
   a housing comprising a lower housing portion containing the base portion and a closeable lid constructed for closing with respect to the lower housing portion with said housing completely enclosing a firearm for protection from ambient weather; and
   the closeable lid being connected to the hinged top portion for movement therewith.

2. The firearm case as defined in claim 1 further comprising:
   a firearm barrel alignment at an end of the base portion of the cage for supporting a barrel end of the firearm; and
   a firearm stabilizer at an opposite end of the base portion of the cage for supporting a butt end of the firearm.

3. The firearm case as defined in claim 1 further comprising:
   a housing having a front wall, a rear wall, a first side wall, a second side wall, a bottom wall, and a top lid defining a cavity therebetween, the cavity being dimensioned and configured to receive the frame with the housing enclosing said frame.

4. The firearm case as defined in claim 1 further comprising:
   a latch having an latch arm and a catch member the latch arm being attached to the hinged top portion and the base portion of the frame;
   the latch arm engaging the catch member to lock the hinged top portion in the closed position; and
   the latch being biased to a locked position.

5. A firearm case constructed for attachment to a motorcycle or an ATV, said firearm case comprising:
   a frame comprising a plurality of pieces that form a cage, the cage comprising a base portion and a hinged top portion, the base portion being configured to hold a firearm, the hinged top portion being configured to cover the top of the firearm and close the cage, when the hinged top portion is moved to a closed position;
   a firearm barrel alignment at an end of the base portion of the cage for supporting a barrel end of the firearm;
   a firearm stabilizer at an opposite end of the base portion of the cage for supporting a butt end of the firearm;

a housing having a front wall, a rear wall, a first side wall, a second side wall, a bottom wall, and a top lid defining a cavity therebetween, the cavity being dimensioned and configured to receive the frame with the housing enclosing said frame;

a latch having an latch arm and a catch member the latch arm being attached to the hinged top portion and the base portion of the frame, the latch arm engaging the catch member to lock the hinged top portion in the closed position; and the latch being biased to the locked position.

6. The firearm case as defined in claim 5 wherein:
the latch is electric whereby the latch is unlocked responsive to a signal by way of a remote source.

7. The firearm case as defined in claim 6 further comprising:
a remote unlock switch that sends the signal to the latch to unlock the latch from a remote location spaced from the frame.

8. The firearm case as defined in claim 7 further comprising:
a time delay module located on the frame, whereby the remote unlock switch sends the signal to the time delay module, the time delay module relaying the signal to the latch to unlock the latch and hold the latch in a unlocked position for a predetermined length of time.

9. The firearm case as defined in claim 8 further comprising:
a key operated mechanical frame lock that is connected to the latch in which a key is placed to unlock the latch independent of the remote unlock switch.

10. The firearm case as defined in claim 5 further comprising:
a firearm lock comprising an upper clamping member and a lower clamping member, the upper clamping member hingedly attached to the lower clamping member and extending downwardly from the hinged top portion of the frame and the lower clamping member positioned in the base portion of the frame intermediate the firearm barrel alignment and the firearm stabilizer, such that the upper clamping member and the lower clamping member face each other, the upper clamping member and the lower clamping member forming an annular closure that encases a barrel of a firearm and locks when in a closed position and releases the firearm when the upper clamping member and the lower clamping member are in an open position, and with the firearm lock being biased to the closed position.

11. The firearm case as defined in claim 10 wherein:
the firearm lock is electric whereby the firearm lock is unlocked responsive to a signal by way of a remote source.

12. The firearm case as defined in claim 11 further comprising:
a remote unlock switch that sends the signal to the firearm lock to unlock the firearm lock from a remote location spaced from the frame.

13. The firearm case as defined in claim 12 further comprising:

a time delay module located on the frame, whereby the remote unlock switch sends the signal to the time delay module, the time delay module relaying the signal to the firearm lock allowing the firearm lock to unlock the firearm lock and hold the firearm lock in an unlocked position for a predetermined length of time.

14. The firearm case as defined in claim 13 further comprising:
a key operated mechanical firearm lock that unlocks the firearm lock independently of the remote unlock switch.

15. The firearm case as defined in claim 10 wherein:
the latch is electric whereby the latch is unlocked responsive to a signal by way of a remote source, the firearm lock is electric whereby the firearm lock is unlocked responsive to a signal by way of a remote source; and a remote unlock switch that sends the signal to the firearm lock and to the latch simultaneously unlocking the firearm lock and the latch from a remote location spaced from the frame.

16. The firearm case as defined in claim 15 wherein:
the time delay module located on the frame, whereby the remote unlock switch sends the signal to the time delay module the time delay module relaying the signal to the firearm lock and to the latch simultaneously unlocking the firearm lock and the latch and allowing the firearm lock and the latch to remain in an unlocked position for a length of time, the firearm lock and the latch returning to the locked position at the expiration of the length of time.

17. The firearm case as defined in claim 16 wherein:
the remote unlock switch is enabled by way of the motorcycle ignition being turned to the auxiliary position.

18. The firearm case as defined in claim 5 comprising:
a mounting assembly, whereby the frame is attached to the rear of the motorcycle or the ATV.

19. A firearm case constructed for attachment to an exterior of a motor vehicle; said firearm case comprising;
an internal clam shell cage member with an upper cage section pivotably connected to a lower cage section for moving between an open and closed position;

a first locking device for lockably latching the upper cage section to the lower cage section;

a firearm clamp having an upper clamp section hingedly attached to a lower clamp section with the lower clamp section mounted in the lower cage section; and the upper clamp section movable between an open position and a clamped locked position encasing a barrel of a firearm disposed in said cage; and said firearm clamp having a second locking device for locking said firearm clamp when in the closed position.

20. A firearm case as defined in claim 19 further comprising:
said first and second locking devices being electric and being unlocked responsive to a signal from a remote unlock switch that sends a signal to simultaneously unlock both first and second locking devices.

\* \* \* \* \*